United States Patent Office 2,922,691
Patented Jan. 26, 1960

2,922,691

ANTHRAQUINONE DYES AND POLYETHYLENE TEREPHTHALATE FIBERS DYED THEREWITH

Paul Grossman, Binningen, Switzerland, assignor to Ciba Limited, Basel, Switzerland, a firm of Switzerland No Drawing. Application July 30, 1956
Serial No. 600,681

Claims priority, application Switzerland August 2, 1955

11 Claims. (Cl. 8—39)

This invention is based on the observation that valuable dyeings and prints can be produced on hydrophobic textile fibers by using as dyestuffs α-hydroxy-anthraquinones which contain a single anthraquinone nucleus and in at least one β-position an alkoxy group of low molecular weight or a phenoxy group.

The term "hydrophobic fibers" includes principally fully synthetic fibers, above all polyester fibers, for example, polyethylene terephthalate fibers which are known in commerce under the registered trademarks "Terylene" and "Dacron," and also artificial fibers of polyamides or polyurethanes, polyacrylonitrile or polyvinyl chloride. There are also included artificial fibers of cellulose esters or ethers, for example, cellulose acetate artificial silk, which as compared with fully synthetic fibers possess a higher capacity for absorbing water, but in contradistinction to the markedly hydrophilic fibers, such as wool, cotton and regenerated cellulose, possess a considerably lower capacity for absorbing water.

The α-hydroxy-anthraquinones used in the present process contain in at least one β-position an alkoxy group of low molecular weight, advantageously an alkoxy group containing from 1–6 carbon atoms, for example, a methoxy, ethoxy, propoxy or butoxy group, or a phenoxy group. The term "alkoxy radical" comprises aliphatic as well as cycloaliphatic alkoxy radicals, for example, cyclohexyloxy radicals. The alkoxy or phenoxy groups may contain simple substituents, for example, halogen atoms or hydroxyl groups.

Especially advantageous are those α-hydroxy-β-alkoxy- or phenoxy anthraquinones, in which at least one alkoxy or phenoxy group is vicinal to a hydroxyl group.

The dyestuffs to be used according to the invention can contain one hydroxyl group in α-position, such as for example, (a)
1-hydroxy-2-methoxy- or ethoxyanthraquinone,
1-hydroxy-2-butoxyanthraquinone,
1-hydroxy-2,7-dimethoxyanthraquinone.

The dyestuffs can, however, contain two hydroxyl groups in α-position, such as for example, (b)
1,4-dihydroxy-2-methoxyanthraquinone,
1,4-dihydroxy-2-cyclohexyloxyanthraquinone,
1,4-dihydroxy-2-phenoxyanthraquinone,
1,5-dihydroxy-2,3,6,7-tetramethoxyanthraquinone.

As examples of dyestuffs with three and more hydroxyl groups there may be mentioned (c)
1,5,8-trihydroxy-2-methoxyanthraquinone,
1,4,5,8-tetrahydroxy-2-phenoxyantharquinone,
1,4,5,8-tetrahydroxy-2,6- or 2,7-dimethoxyanthraquinone.

The compounds mentioned under (a) and (b) are known, whereas those mentioned under (c) are new. They may be obtained provided they contain an alkoxy group having 1–4 carbon atoms by alkylating the corresponding polyoxy-anthraquinones; under normal alkylation conditions only the hydroxyl groups in β-position are alkylated. Alkoxy radicals with more than 4 carbon atoms, or phenoxy radicals are advantageously introduced by known methods in exchange for a halogen atom, preferably a bromine atom.

The aforesaid compounds produce on polyester fibers strong yellow to red tints of excellent fastness to light, either by dyeing under pressure or with the addition of a swelling agent. These dyestuffs are also distinguished by their good affinity and reserve properties for wool.

In some cases it is especially advantageous to use mixtures of different dyestuffs of the kind used in this invention.

The aforesaid dyestuffs are advantageously used for dyeing in a finely dispersed form and with the addition of a dispersing agent, such as soap, sulfite cellulose waste liquor or a synthetic detergent, or a combination of different wetting and dispersing agents. It is usually of advantage, prior to dyeing, to convert the dyestuff to be used into a dyeing preparation which contains a dispersing agent and the finely divided dyestuff, so that upon diluting the dyestuff preparation with water a fine dispersion is produced. Such dyestuff preparations can be made in known manner, for example, by precipitating the dyestuff from sulfuric acid and grinding the resulting suspension with sulfite cellulose waste liquor, if desired, also by grinding the dyestuff in a highly efficient grinding apparatus in the dry or wet state with or without the addition of a dispersing agent during the grinding process.

In order to produce strong dyeings on polyethylene terephthalate fibers it is of advantage to add to the dyebath a swelling agent or to carry out the dyeing process at a temperature above 100° C., for example, under pressure at 130° C. Suitable swelling agents are aromatic carboxylic acids, for example benzoic acid or salicylic acid, phenols, for example, ortho- or para-hydroxydiphenyl, halogenated aromatic compounds, such as chlorobenzene, ortho-dichlorobenzene or trichlorobenzene, phenyl methyl carbinol or diphenyl. For dyeings under pressure it is of advantage to keep the dyeing bath slightly acid for example by adding a weak acid, such as acetic acid. The dyeings so produced are characterized in general by their excellent fastness to light.

The following examples illustrate the invention the parts and percentages being by weight:

*Example 1*

1 part of an aqueous paste of 1-hydroxy-2-methoxy-antharquinone, prepared in the manner described below, is ground with about 1 part of dried sulfite cellulose waste liquor in a ball mill to form a fine paste.

100 parts of "Terylene" fibrous material are precleaned in a bath which contains in 1000 parts of water 1–2 parts of the sodium salt of N-benzyl-µ-heptadecylbenzimidazole disulfonic acid and 1 part of a concentrated aqueous solution of ammonia, for ½ hour. The material is then entered into a dyebath in which 1 part of the dyestuff paste prepared as described above has been dispersed with the addition of 4 parts of the sodium salt of N-benzyl-µ-heptadecyl-benzimidazole disulfonic acid. The whole is heated in a pressure vessel at 132° C. and maintained at that temperature for about ½ hour. The material is then rinsed well and, if necessary, washed with a solution which contians in 1000 parts of water 1 part of the sodium salt of N-benzyl-µ-heptadecyl-benzimidazole disulfonic acid, for ½ hour at 60–80° C. There is obtained a strong yellow dyeing of excellent fastness to light. If instead of using 1-hydroxy-2-methoxyantharquinone there is used 1-hydroxy-2-butoxyanthraquinone, 1- hydroxy-2,7-dimethoxyanthraquinone or 1,5-dihydroxy-2,3,6,7-tetramethoxyanthraquinone, dyestuffs are obtained with similar properties.

The 1-hydroxy-2-methoxyanthraquinone used in this example may be prepared as follows:

12 parts of 1:2-dihydroxyanthraquinone are stirred for about 10 hours at 80–90° C. in 100 parts of nitrobenzene with 12.5 parts of finely ground sodium carbonate and 10 parts of dimethylsulfate. The end of the reaction is reached when a test portion in alcohol, which contains a few drops of caustic soda solution, exhibits the red color of the sodium salt of 1-hydroxy-2-methoxyanthraquinone, and no longer has the violet color of the sodium salt of 1:2-dihydroxyanthraquinone. The reaction mixture is then subjected to steam distillation in order to remove the nitrobenzene and the 1-hydroxy-2-methoxyanthraquinone is precipitated by acidification, filtered off and washed until neutral. 1-hydroxy-2,7-dimethoxyanthraquinone can be obtained in an analogous manner from 1,2,7-trihydroxyanthraquinone, and 1,5-dihydroxy-2,3,6,7-tetramethoxyanthraquinone from 1,2,3,5,6,7-hexahydroxyanthraquinone according to the same process. 1-hydroxy-2-butoxyanthraquinone can be obtained by reacting 1,2-dihydroxyanthraquinone with para-toluene sulfonic acid butyl ester in the presence of sodium carbonate in nitrobenzene at about 140° C.

*Example 2*

1 part of an aqueous paste of 1,4-dihydroxy-2-phenoxy-anthraquinone, the preparation of which is described below, is ground with about 1 part of dried sulfite cellulose waste liquor in a ball mill to form a fine paste.

100 parts of "Terylene" fibrous material are precleaned in a bath containing in 1000 parts of water 1–2 parts of the sodium salt of N-benzyl-$\mu$-heptadecyl-benzimidazole disulfonic acid and 1 part of a concentrated aqueous solution of ammonia for ½ hour. The material is then swirled for ½ hour at 80° C. in a dyebath which contains in 3000 parts of water 15 parts of a mixture of approximately equal parts of ortho-hydroxydiphenyl, pine oil and Turkey red oil and 15 parts of acetic acid. The bath is then cooled to 50° C., and the dyestuff paste prepared as described in the first paragraph is added. The bath is raised to the boil in the course of ½ to ¾ hour and dyeing is carried on almost at the boil for 1–1½ hours. The material is then rinsed well and, if desired, washed with a solution containing in 1000 parts of water 1 part of the sodium salt of N-benzyl-$\mu$-heptadecyl benzimidazole disulfonic acid for ½ hour at 60–80° C. There is obtained a strong orange dyeing having good fastness to light.

When 1,4-dihydroxy-2-(para-methyl-phenoxy)-anthraquinone, 1,4-dihydroxy-2-methoxyanthraquinone or 1,4-dihydroxy-2-cyclohexyloxyanthraquinone is used, dyeings with similar properties are obtained.

The 1,4-dihydroxy-2-phenoxyanthraquinone used in this example can be prepared as follows:

10 parts of 1,4-dihydroxy-2-bromoanthraquinone are heated in 35 parts of phenol with 4 parts of potassium carbonate for 3 hours at 120° C. and for another 3 hours at 130–135° C. The dyestuff is precipitated with methanol, filtered and washed with methanol.

According to an analogous process 1,4-dihydroxy-2-(para-methylphenoxy)-anthraquinone and 1,4-dihydroxy-2-cyclohexyloxyanthraquinone can be obtained. 1,4-dihydroxy-2-methoxyanthraquinone can be obtained according to the method described in Example 1 by alkylating 1,2,4-trihydroxyanthraquinone with dimethyl sulfate.

*Example 3*

1 part of an aqueous paste of 1,5,8-trihydroxy-2-methoxyanthraquinone, prepared in the manner described below, is ground with about 1 part of dried sulfite cellulose waste liquor in a ball mill to form a fine paste.

100 parts of "Terylene" fibrous material are precleaned in a bath which contains in 1000 parts of water 1–2 parts of the sodium salt of N-benzyl-$\mu$-heptadecylbenzimidazole disulfonic acid and 1 part of a concentrated aqueous ammonia solution, for ½ hour. The material is then entered into a dyebath in which the dyestuff paste obtained as described in the first paragraph has been dispersed with the addition of 4 parts of the sodium salt of N-benzyl-$\mu$-heptadecyl-benzimidazole disulfonic acid. In addition thereto the dyebath contains 15 parts of acetic acid. The whole is heated in a pressure vessel to 132° C. and maintained at that temperature for about ½ hour. The material is then rinsed well and, if necessary, washed with a solution which contains in 1000 parts of water 1 part of the sodium salt of N-benzyl-$\mu$-heptadecyl-benzimidazole disulfonic acid, for ½ hour at 60–80° C. There is obtained a pure, strong red-orange dyeing of excellent fastness to light.

When 1,4,5,8-tetrahydroxy-2-phenoxy-anthraquinone is used as dyestuff, red tints with very good fastness properties are obtained.

The 1,5,8-trihydroxy-2-methoxyanthraquinone used in this example can be prepared in an analogous manner to that described in Example 1 for the preparation of 1-hydroxy-2-methoxy-anthraquinone.

The 1,4,5,8-tetrahydroxy-2-phenoxy-anthraquinone used in this example can be obtained by an analogous process to that described in Example 2 for the preparation of 1,4-dihydroxy-2-phenoxy-anthraquinone.

*Example 4*

1.2 parts of 1,4-dihydroxy-2-methoxyanthraquinone are converted in the manner described in the first paragraph of Example 1 into a finely dispersed paste. The paste is added to a dyebath which contains in 3000 parts of water 9 parts of soap, then 100 parts of well wetted cellulose triacetate artificial silk are entered at 40° C., the temperature is raised to 100° C., and dyeing is carried on for one to two hours at that temperature. There is obtained a pure orange dyeing.

What is claimed is:

1. Polyethylene terephthalate fibers dyed with an $\alpha$-hydroxy-anthraquinone consisting of a single anthraquinone nucleus which contains in at least one $\beta$-position an etherified hydroxyl group and which is free from other substituents.

2. Polyethylene terephthalate fibers dyed with an $\alpha$-hydroxy-anthraquinone consisting of a single anthraquinone nucleus which contains in at least one $\beta$-position a member selected from the group consisting of an alkoxy radical and a phenoxy radical and which is free from other substituents.

3. Polyethylene terephthalate fibers dyed with an $\alpha$-hydroxy-anthraquinone consisting of a single anthraquinone nucleus which contains in at least one $\beta$-position and vicinal to a hydroxyl group a member selected from the group consisting of an alkoxy radical having at most 6 carbon atoms and a phenoxy radical and which $\alpha$-hydroxy-anthraquinone is free from other substituents.

4. Polyethylene terephthalate fibers dyed with 1-hydroxy-2,7-dimethoxyanthraquinone.

5. Polyethylene terephthalate fibers dyed with 1,4-dihydroxy-2-methoxyanthraquinone.

6. Polyethylene terephthalate fibers dyed with 1,4-dihydroxy-2-phenoxyanthraquinone.

7. Polyethylene terephthalate fibers dyed with 1,5,8-trihydroxy-2-methoxyanthraquinone.

8. Polyethylene terephthalate fibers dyed with 1,4,5,8-tetrahydroxy-2-phenoxyanthraquinone.

9. An anthraquinone derivative of the formula

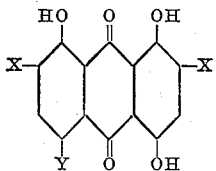

in which Y represents a member selected from the group consisting of a hydrogen atom and a hydroxyl group and at least one X represents an etherified hydroxyl group, and any remaining X represents a hydrogen atom.

10. The anthraquinone dyestuff of the formula

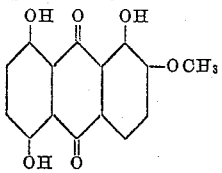

11. The anthraquinone dyestuff of the formula

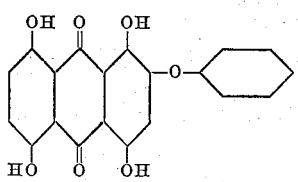

References Cited in the file of this patent
UNITED STATES PATENTS 2,819,725   Grossman _____ Jan. 7, 1958

OTHER REFERENCES

Synthetic Dyes and Pigments, by H. A. Lubs, Reinhold Pub. Corp., N.Y.C., 1955, pp. 418 and 419.
Am. Dyestuff Reporter, July 5, 1954, pp. 426–437.
Oxford, Chem. Abs., vol. 34, col. 7924 (1940).
Bentley: J. Chem. Soc., vol. 93 (1908), pp. 435–438.